United States Patent [19]

Auerbach

[11] Patent Number: 4,466,122
[45] Date of Patent: Aug. 14, 1984

[54] DISCRIMINATOR FOR PATTERN RECOGNITION

[76] Inventor: Sidney Auerbach, 246 West End Ave., New York, N.Y. 10023

[21] Appl. No.: 234,814

[22] Filed: Feb. 17, 1981

[51] Int. Cl.³ .............................................. G06K 9/62
[52] U.S. Cl. ..................................... 382/17; 358/107; 382/29; 382/33
[58] Field of Search ....................... 364/414, 416, 515; 340/146.3 C, 146.3 R, 146.3 CA; 343/5 MM, 5 SA, 5 DP, 5 FT; 358/101, 105–109; 382/6, 17, 18, 28, 29, 33; 381/37, 38, 41

[56] References Cited

U.S. PATENT DOCUMENTS

| | | | |
|---|---|---|---|
| 3,319,229 | 5/1967 | Fuhr et al. | 382/29 |
| 3,400,368 | 9/1968 | LeMay | 340/146.3 C |
| 3,548,374 | 12/1970 | Vaccaro | 340/146.3 C |
| 3,674,926 | 7/1972 | Dewey et al. | 358/107 |
| 3,889,055 | 6/1975 | Knight | 358/107 |
| 3,908,078 | 9/1975 | Auerbach et al. | 382/6 |
| 4,028,673 | 6/1977 | Taylor et al. | 382/17 |
| 4,176,376 | 11/1979 | Kamachi et al. | 358/107 |
| 4,257,063 | 3/1981 | Loughry et al. | 358/108 |
| 4,346,405 | 8/1982 | Yoda et al. | 364/515 |
| 4,399,554 | 8/1983 | Perkins et al. | 358/101 |

Primary Examiner—Leo H. Boudreau
Attorney, Agent, or Firm—Ladas & Parry

[57] ABSTRACT

A discrimination apparatus for deriving pattern recognition information by selecting predetermined components of a video image for generating a narrow-width identification signal. This is achieved by removing the higher frequency components of the video image of the object to be identified and generating a frequency information signal and an amplitude information signal of the unknown pattern. These information signals are then compared with known amplitude and frequency information signals of known patterns stored in a data base. An identification is made when the respective signal match within predetermined tolerances and associated information is output in response to this identification.

3 Claims, 6 Drawing Figures

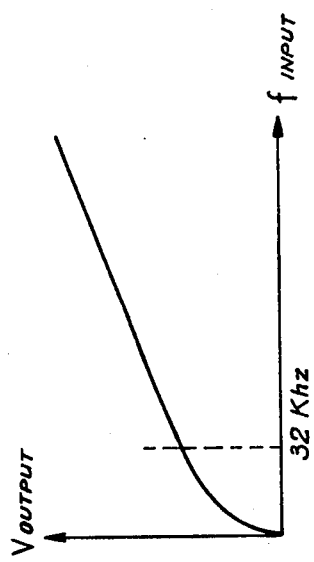
FIG. 5
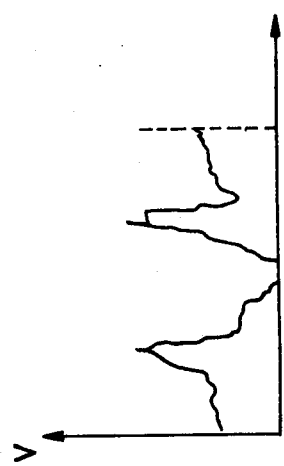
FIG. 4
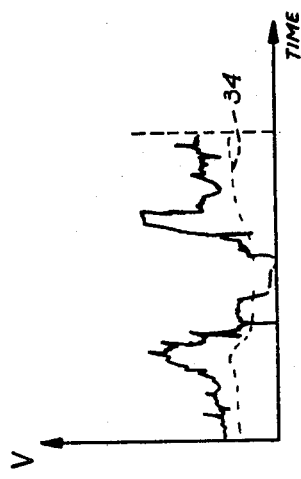
FIG. 6
FIG. 3

DISCRIMINATOR FOR PATTERN RECOGNITION

TECHNICAL FIELD

The invention relates to a method and discriminator apparatus for deriving pattern recognition information by selecting predetermined components of a visual image for generation of a narrow bandwidth identification signal useful for pattern recognition.

BACKGROUND ART

Present approaches to mechanized pattern recognition can be characterized in three general categories. One approach is the employment of multi-process mechanisms which are designed to simulate the human brain's own method of pattern recognition. Dr. Frank Rosenblatt was one of the first to employ such techniques. In 1959, under contract to the Office of Naval Research, he demonstrated a device which, while it had only sixty-four artificial "neurons", was able to recognize all of the characters of the alphabet, regardless of format or size. While the theory of multi-layered multifunctional and cross-coupled "perceptrons" pioneered by Rosenblatt has been widely developed since 1959, the complexity and expense of such systems has always limited their practical employment.

An alternative approach toward the problem of pattern recognition involves the employment of an "artificial" technique designed to deal with a specific problem on the basis of known determinative characteristics. Inherently, such an approach to the pattern recognition problem is limited to so-called dedicated systems for use in specific specialized applications. For example, dedicated systems are employed in such areas as robotics, pattern reading code converters such as bar code readers, voice actuated mechanisms and optical character readers.

The third approach toward pattern recognition consists essentially of generating a video image of the object to be recognized using, by way of example, a television camera, and processing that image by passing the composite video through a low pass filter to generate a relatively low frequency waveform corresponding to the video image. This waveform is then compared to similar waveforms in a data base on a point by point basis in order to obtain a match between a data base waveform of known parameters and the unknown waveform corresponding to the object to be recognized. The data base waveform is generated in the same manner as the unknown waveform. This comparison is done by a digital computer which, when it determines that a match has been made, outputs the identification information associated with the known waveform which has been associated with the unknown waveform and, hence, is an identification of the pattern to be recognized. Systems of this last variety are illustrated in my earlier patents, namely, U.S. Pat. Nos. 3,877,019 and 3,908,078 under which a number of commercial products are manufactured.

While the systems disclosed in my earlier patents provide an effective solution to the problem of non-specialized pattern recognition without the need for extensive information processing, the very simplicity of the system, which makes it so desirable, renders it unsuitable for solving a number of classic pattern recognition problems.

DISCLOSURE OF INVENTION

The invention, as claimed, is intended to provide a remedy. It solves the problem of providing a simple and reliable pattern recognition system capable of solving a wide variety of pattern recognition problem.

Generally, the above is achieved by removing the higher frequency components of a composite video picture of the object to be identified and developing a frequency information profile and an amplitude information profile of the unknown pattern and comparing these with known frequency and amplitude profiles of known patterns to determine an identification.

BRIEF DESCRIPTION OF THE DRAWINGS

One way of carrying out the invention is described in detail below with reference to the drawings which illustrate one specific embodiment, in which;

FIG. 1 is a block diagram of a pattern recognition system constructed in accordance with the present invention showing its interface with a data processor and data base;

FIGS. 2–4 are graphic representations of the outputs of intermediate stages of the inventive system;

FIG. 5 is a graphic representation of the characteristics of one of the elements of the inventive system; and FIG. 6 is a graphic representation of the output of the frequency information deriving circuitry of the inventive system.

BEST MODE FOR CARRYING OUT THE INVENTION

Figures 1, 2:
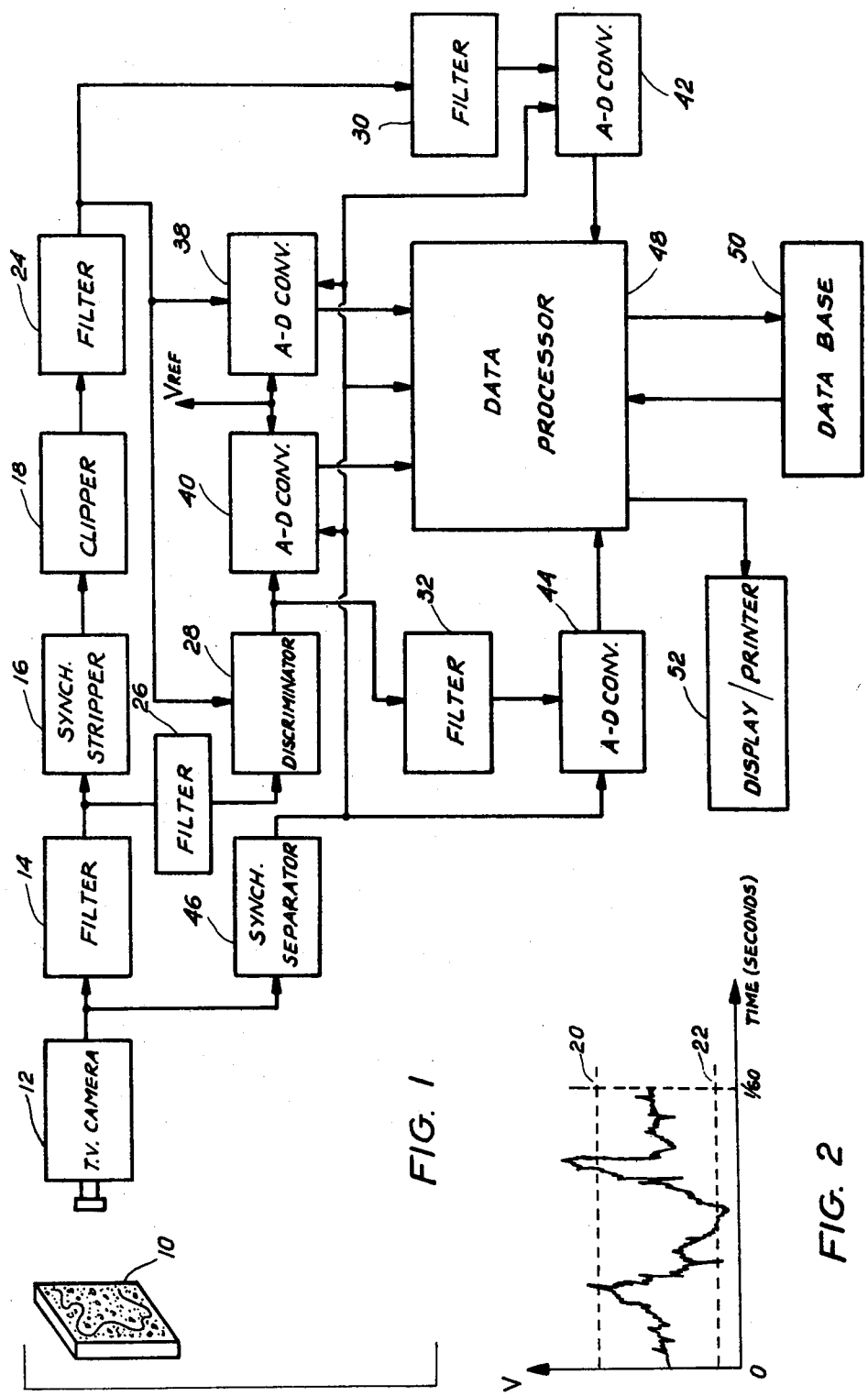

As illustrated in FIG. 1, the inventive system processes a pattern, which may typically be in the form of a two-dimensional representation 10. Alternatively, two-dimenstional representation 10 may be replaced by a three-dimensional object such as a man's face, a coin to be authenticated or a physical object such as lumber to be graded. In practice, it is expected that two-dimensional representation will be the usual form in which information is fed into the machine, inasmuch as such information may be conveniently moved from place to place through the mails or via telecopier machines. Two-dimensional representation 10 is scanned by a conventional commercial television camera 12 of the type which produces thirty 525-line frames (each in two half frames). The composite video output of camera 12 is provided to a low pass filter 14 whose band pass characteristic is such that it has a cutoff frequency at approximately 3.5 MHz. The output of low pass filter 14 is, in turn, provided to a synch stripper 16. Synch stripper 16 is a circuit which removes the synchronization pulses from the filtered composite video signal at the output of filter 14.

The output of synch stripper 16 may, typically, for a single frame of the wave form take the appearance illustrated in FIG. 2. This output is in turn fed to a clipper 18 which is effectively an amplitude window which removes the peaks and troughs of the frame signal illustrated in FIG. 2. Generally, while the upper and lower thresholds 20 and 22, respectively, of clipper 18 may be varied, typically, threshold 22 is set at approximately 10% of the peak value and threshold 20 is set at approximately 80% of the peak value. Thus, any portion of the signal below threshold 22 is reduced to zero. Those portions of the signal above threshold 20 are reduced to 70% of the peak value and all other values are reduced by 10% of the peak value. By way of example, the operation of a clipper 18 on a typical video signal half-frame illustrated in FIG. 2 is shown by the signal illustrated in FIG. 3 which would appear at the output of clipper 18 when it is fed with the signal illustrated in FIG. 2.

The output of clipper 18 is coupled to a low pass filter 24 whose cut-off frequency is approximately half the sample frequency of the downstream analog-to-digital converters which typically sample at a rate of about 100 samples per half-frame. The output of filter 24, thus, substantially appears as is illustrated in FIG. 4. Ideally, the output of filter 24 would have no more information than that which can be read by the downstream analog-to-digital converters. The output of low pass filter 14 is also sent to a frequency discriminator 26. The characteristics of discriminator 26 are substantially logarithmic in the range below 32 KHz. and linear in the range above 32 Khz., as shown in FIG. 5. The gain of discriminator 26 is also subject to control by an automatic gain control voltage provided from the output of filter 24. Thus, the output of discriminator 26 is primarily a logarithmic function of the frequency of the low frequency components of the output of filter 14, a linear function of the frequency of the high frequency components of the signal at the output of filter 14 and secondarily a function of the amplitude of the signal at the output of filter 24. Such a typical output is illustrated in FIG. 6.

The output of filter 24 is sent to a low pass filter 30 whose cut-off frequency is approximately 60 Hz. The output of discriminator 28 is also sent to a low pass filter 32 having a cut-off frequency on the order of about 60 Hz. The outputs 34 and 36 of filters 30 and 32, respectively, are illustrated in FIGS. 3 and 6. Outputs 34 and 36 are the very low frequency components of the amplitude and frequency information, respectively, contained in the composite video signal produced at the output of camera 12.

The outputs of filter 24, discriminator 28 and filters 30 and 32 are all sent to analog-to-digital converters which provide this information in digital form to downstream digital systems. The output of filter 24, which is illustrated in solid lines in FIG. 4 is sampled at a rate of 100 samples per half-frame and is changed into a series of digital values by analog-to-digital converter 38. In a similar manner the output of discriminator 28 is sampled at the same rate and converted to a series of digital values by analog-to-digital converter 40. Similarly, analog-to-digital converters 42 and 44 sample the outputs of filters 30 and 32, respectively, at the same rate and convert the outputs of those filters into a series of digital values.

Timing information for the analog-to-digital conversion is provided by removing the synch signal from the composite video signal at the output of camera 12. This function is achieved using a conventional synch separator circuit 46. Synch separator 46 produces at its output only those pulses contained in the composite video signal which are synchronization with the beginning of the half-frame signal. This synchronization output is then provided to analog-to-digital converters 38–44 to synchronize their operations with the half-frame information provided to them.

The outputs of analog-to-digital converter 38 and analog-to-digital converter 43 are provided to a data processor 48. Data processor 48 is of conventional design and is programmed to subtract the low frequency component provided by converter 42 from the amplitude information signal provided by converter 38 to generate an amplitude profile signal. In like manner, the outputs of converters 40 and 44 are also provided to data processor 48 which subtracts the low frequency component generated by converter 44 from the frequency information signal generated by analog-to-digital converter 40 to provide a frequency profile signal. The timing information generated by synch separator 46 is used to control the operation of data processor 48 in order that its treatment of information is synchronized to the outputs of the analog-to-digital converters.

Data processor 48 uses the amplitude profile signal and the frequency profile signal, which are in the form of a series of sample points representative of the frequency and amplitude signals, as "finger prints" and compares these two signals with a library of such signals of known origin contained within a data base 50. In the event of such an identification, the data processor would print the information associated with the known signals as data associated with the unknown image before the T.V. camera. A match would be achieved if a minimum number of sample points fell within a maximum range of deviation from the corresponding points in a particular data base waveform pair. In the event that no match between known data and the two profile signals is achieved the printer 52 would print a message to that effect allowing an identification to be made by a human being. This human originated information would be added to the data base for future reference.

In operation, camera 12 views an image 10 and produces a composite video signal which would be passed through a filter 14 which would eliminate only some of its higher frequency components. The output of filter 14 would pass through synch stripper 16, clipper 18 and filter 24 to produce a low frequency amplitude information signal. Similarly the output of filter 14 would be passed through a filter 26 and a discriminator 28 to produce a frequency bearing signal. The low frequency components of these signals would be removed by filters 30 and 32. The frequency and amplitude signals and the low frequency signals would then be sent to the data processor which would derive a pair of profile signals and compare them to the data base, printing the data associated in the data base with the identified (previously unknown) signals via printer 52.

Naturally, the programming of the data processor will vary depending upon the computer used. However, generally, the same may be achieved by taking each of the points of the two profile signals corresponding to the unidentified pattern to be identified and comparing it to its corresponding point in a data base pair of profiles for the various identifiable data base profile signal pairs. If the point's value in the unknown signal is equal to or within a specified range of deviation from the value of its corresponding point's value in the identified signal, there is a point match. If not there is a mismatch. In order for there to be an identification, a minimum number of points of the profile signals generated from the unidentified pattern must match their corresponding points in the two corresponding data base profile signals. If no identification is achieved the point-by-point comparison is tried for the next pair of profile signals in the data base, and the process repeated until a match is made. A further refinement is to perform the operation with all the data base signal pairs to get the best match. The time spent by the data processor in performing this task may be reduced by stopping the comparison as soon as the number of unmatched points exceeds the lowest number of unmatched points for previously checked data base profile signal pairs.

An important modification of the above-described system consists in the addition and/or substitution of various forms of predictive information (including treatment with corresponding survival and morbidity information) for the usual identification data produced by optically scanning unknown patterns.

The same would be achieved by developing a data base which not only would include identification waveforms for a number of diagnosable conditions, but would also include, in addition to the diagnostic information, the statistical survival and morbidity results of various therapies. Thus, as soon as the waveforms indicating the condition to be identified have been identified, the machine may be made to recall such items as pictures of conditions which share an identity with a diagnosed condition, the treatment applied to those conditions and the experienced survival and morbidity. A further advantageous variation would involve the selection by the computer of those cases which had the most successful morbidity or survival rates, or the best treated cases on the bases of other data which would be selected by the user.

An examination of this data by the user provides a useful guide in the selection of a most appropriate mode of therapy for any disease process detected in the unknown field. Taken along with additional pertinent critical data on the patients represented in the data base, the system would thus produce a recommended form or forms of treatment based on the known forms of therapy and available information on risks involved.

For example, in the data base consisting of numeric representations of a particular type of breast cancer, such as infiltrating adenocarcinoma, various forms of therapy are present in the charts of the patients from which the biopsy material of the data base was obtained. Examples are no treatment, complete local excision, simple mastectomy, radial mastectomy, radial mastectomy with chemotherapy, radial mastectomy with hormone therapy and so forth. If the lesion under inquiry matches with cases treated as above, the assumption is made that similar treatment given to the unknown case will result in results similar to that of the data base cases.

Similarly, X-rays of various inflammatory lung lesions, if used as data base along with antibiotics of various types will provide instantaneous data on the most effective means of therapy for as yet untreated cases. It is even possible that the above method would eliminate the need for diagnosis inasmuch as treatment and results of treatment information would be displayed by the system.

Yet another refinement of the instant invention would involve the generation of a frequency profile signal and an amplitude profile signal for both a horizontal and vertical scan of a picture of the unknown condition. The same may be achieved by generating two profile signals for the picture 10, rotating the picture by 90 degrees and generating two more profile signals orthogonally related to the other two generated profile signals. These four profile signals would then be sent to the analog-to-digital converters and compared in the data processor to a four signal data base.

While illustrative embodiments of the invention have been disclosed, modifications will be obvious to those of ordinary skill in the art. Such modifications are within the scope of the invention which is limited and defined only by the appended claims.

I claim:

1. A system for recognizing a condition, comprising:
   (a) video signal generating means for generating a video signal;
   (b) means, responsive to said video signal for deriving a generated amplitude information signal from said video signal;
   (c) means, responsive to said video signal for deriving a generated frequency information signal from said video signal;
   (d) means for deriving a synchronization information signal indicating the beginning and end of said video signal;
   (e) a data base of known frequency and amplitude information signals associated with intellectual identifications comprising conditions identified by an intellectual observer;
   (f) computer means responsive to said synchronization information signal and said amplitude and frequency information signals for comparing said generated amplitude and frequency information signals to said known amplitude and frequency information signals in said data base and determining whether said generated amplitude and frequency information signals match said known amplitude and frequency information signals, respectively; and
   (g) output means for displaying the intellectual identification associated with the pair of said known frequency and amplitude information signals in said data base which match said generated amplitude and frequency information signals, respectively.

2. A system as in claim 1 wherein each of said intellectual indentifications is associated with treatment information stored in said data base, said treatment information comprising information on the treatment of one of said conditions and information on the results of said treatment.

3. A system as in claim 1 further comprising means to obtain an orthogonal video signal from which generated orthogonal amplitude and frequency information signals are derived, and wherein said data base includes known orthogonal amplitude and frequency information signals corresponding to said known amplitude and frequency information signals, and wherein said computer means determines whether said generated orthogonal amplitude and frequency information signals match said known orthogonal amplitude and frequency signals, respectively.

* * * * *